(12) United States Patent
Parkvall et al.

(10) Patent No.: US 8,588,845 B2
(45) Date of Patent: Nov. 19, 2013

(54) METHOD AND APPARATUS IN A TELECOMMUNICATIONS NETWORK

(75) Inventors: Stefan Parkvall, Stockholm (SE); Johan Torsner, Masaby (FI); Michael Meyer, Aachen (DE); Mats Sågfors, Kyrkslätt (FI); Robert Baldemair, Solna (SE); David Astely, Bromma (SE); Henning Wiemann, Aachen (DE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 293 days.

(21) Appl. No.: 12/991,629

(22) PCT Filed: Jan. 28, 2009

(86) PCT No.: PCT/SE2009/050083
§ 371 (c)(1),
(2), (4) Date: Nov. 8, 2010

(87) PCT Pub. No.: WO2009/154540
PCT Pub. Date: Dec. 23, 2009

(65) Prior Publication Data
US 2011/0059767 A1     Mar. 10, 2011

Related U.S. Application Data

(60) Provisional application No. 61/073,921, filed on Jun. 19, 2008.

(51) Int. Cl.
*H04M 1/00* (2006.01)
(52) U.S. Cl.
USPC ...................................................... 455/550.1
(58) Field of Classification Search
USPC ........... 455/101, 450, 451, 452.1, 452.2, 466, 455/509, 550.1, 436, 431, 406; 370/328, 370/329, 338, 341, 343, 344, 330, 235, 438, 370/436, 356
See application file for complete search history.

(56) References Cited

U.S. PATENT DOCUMENTS

2006/0171353 A1     8/2006   Nagata et al.
(Continued)

FOREIGN PATENT DOCUMENTS

WO     2008/041819     4/2008

OTHER PUBLICATIONS

International Search Report for PCT/SE2009/050083, mailed Jul. 10, 2009.
(Continued)

*Primary Examiner* — Kiet Doan
(74) *Attorney, Agent, or Firm* — Nixon & Vanderhye, P.C.

(57) ABSTRACT

According to the present invention, a receiving node of a telecommunications network (20) (e.g. a radio base station (22) in uplink, or a mobile terminal (24) in downlink) transmits a single acknowledgement message to a transmitting node (e.g. a mobile terminal (24) in uplink, or a radio base station (22) in downlink) in respect of signals received over a plurality of frequency-aggregated carriers (component carriers) (10) between the transmitting and receiving nodes. If all signals are decoded correctly in the receiving node, a positive acknowledgement message (ACK) is sent to the transmitting node; if not all signals are decoded correctly, a negative acknowledgement message (NACK) is sent, or no acknowledgement message is sent. In this way, a single acknowledgement message can be sent for signals received over multiple carriers. The acknowledgement message can have the same format as legacy standards (for example, as specified in Release 8 of the 3GPP specifications), providing compatibility with existing equipment. The number of messages is also reduced compared with the straightforward approach of transmitting individual acknowledgement messages per component carrier.

18 Claims, 4 Drawing Sheets

(56) References Cited

U.S. PATENT DOCUMENTS

| | | | |
|---|---|---|---|
| 2006/0221883 A1 | 10/2006 | Damnjanovic | |
| 2007/0060165 A1* | 3/2007 | Black et al. | 455/450 |
| 2008/0095252 A1* | 4/2008 | Kim et al. | 375/260 |
| 2008/0205446 A1 | 8/2008 | Popescu | |
| 2009/0175324 A1* | 7/2009 | Sampath et al. | 375/222 |

OTHER PUBLICATIONS

International Preliminary Report on Patentability, completed May 20, 2010.

Mexican Office Action (with English translation) mailed May 22, 2012 in Mexican application MX/a/2010/011830.

* cited by examiner

METHOD AND APPARATUS IN A TELECOMMUNICATIONS NETWORK

This application is the U.S. national phase of International Application No. PCT/SE2009/050083, filed 28 Jan. 2009, which designated the U.S. and claims priority to U.S. application No. 61/073,921, filed 19 Jun. 2008, which are hereby incorporated by reference.

The present invention relates to telecommunications, and more particularly to a method and apparatus for acknowledging transmissions between network elements of a telecommunications network.

BACKGROUND

E-UTRA (evolved universal terrestrial radio access) according to Release 8 of the 3GPP specifications supports bandwidths up to 20 MHz. However, one of the requirements of future releases of this standard is expected to be the support of bandwidths larger than 20 MHz. A further important requirement on such releases is to assure backward compatibility with Release 8. This should also include spectrum compatibility. That would imply that a future-release carrier, wider than 20 MHz, should appear as a number of Rel-8 carriers to a Rel-8 terminal. Each such carrier can be referred to as a Component Carrier. In particular for early deployments of future releases, it can be expected that there will be a smaller number of future-release terminals compared to many legacy Rel-8 terminals. Therefore, it is necessary to assure an efficient use of a wide carrier also for legacy terminals, i.e. that it is possible to implement carriers where legacy terminals can be scheduled in all parts of the wideband future-release carrier.

The straightforward way to obtain this would be by means of carrier aggregation. Carrier aggregation implies that a future-release terminal can receive multiple component carriers, where the component carriers have, or at least have the possibility of having, the same structure as a Rel-8 carrier. Carrier aggregation is illustrated in FIG. 1 where five component carriers 10, each of 20 MHz bandwidth, have been aggregated together to form an aggregated bandwidth of 100 MHz.

3GPP Release 8, as with many telecommunications standards, makes use of automatic repeat request (ARQ) schemes, and particularly hybrid ARQ (HARQ). Thus, when a receiving terminal correctly decodes a transmission from a transmitting terminal, it responds with a positive acknowledgement (ACK) message. When the receiving terminal incorrectly or unsuccessfully decodes a transmission from the transmitting terminal, it responds with a negative acknowledgement (NACK) message, or alternatively does not respond at all. The transmitting terminal can then retransmit the previously sent transmission. The incorrectly decoded transmission may be discarded; or it may be stored to allow re-combining with the retransmission through techniques known to those skilled in the art. For example, chase combining or incremental redundancy may be employed to increase the probability that the transmission will be successfully decoded when retransmitted and combined with the stored previous transmission.

In Release 8 of the 3GPP specifications, downlink transmissions are dynamically scheduled. That is, in each subframe a radio base station transmits over a control channel control information indicating which terminals are supposed to receive data and upon which resources in the current downlink subframe that data will be transmitted. This control signaling is typically transmitted in the first 1, 2 or 3 symbols in each subframe.

A terminal will thus listen to the control channel, and if it detects a downlink assignment addressed to it, will attempt to decode the data and generate feedback in response to the transmission in the form of an ACK or a NAK (or no response at all) depending on whether the data was decoded correctly or not.

However, no method has so far been specified for transmitting ACK or NAK messages when more than one component carrier are aggregated together in the frequency domain, as shown in FIG. 1, for example.

One possibility for realizing carrier aggregation is to perform coding and hybrid-ARQ retransmissions per component carrier. A straightforward way of realizing this is to transmit multiple acknowledgement messages, one per component carrier. If the number of component carriers in the uplink is at least as large as the number of component carriers in the downlink, one possibility could be to have a one-to-one mapping between downlink and uplink component carriers such that data transmission on downlink component carrier n is acknowledged on uplink component carrier n. However, it cannot be assumed that the same number of component carriers is used in uplink and downlink. Rather, on the contrary, the most likely scenario is to have a larger number of downlink component carriers than uplink component carriers as the need for high data rates is expected to be greater in the downlink. Thus, transmitting multiple hybrid-ARQ acknowledgement messages, one per component carrier, can in some situations be troublesome.

Introducing a multi-bit hybrid-ARQ acknowledgement format is another possibility. However, transmission of multiple bits for hybrid-ARQ typically reduces the uplink coverage since energy per bit, or signal-to-noise ratio (SNR) target, decreases as more bits are transmitted. Furthermore, the capacity of the control signalling is degraded, both due to the increase in inter-cell interference and due to the increased amount of (time-frequency) resources needed in a cell to transmit multiple bits.

The current LTE specification has the possibility to transmit acknowledgement messages of up to two bits. This is used to support spatial multiplexing (MIMO) in which case two transport blocks on a single component carrier need to be acknowledged. In principle, this structure could be used for two separate component carriers instead. However, this solution is limited to at most two component carriers and, furthermore, does not allow the use of spatial multiplexing when multiple component carriers are scheduled.

Thus, it is necessary to find a solution to the problem of providing acknowledgements for each of the component carriers from the receiver to the transmitter without resorting to new control signalling formats or requiring multiple component carriers also in the reverse direction. Furthermore, there may be a need to improve the uplink control signalling coverage and capacity.

SUMMARY OF INVENTION

According to the present invention, a receiving node of a telecommunications network (e.g. a radio base station in uplink, or a mobile terminal in downlink) transmits a single acknowledgement message to a transmitting node (e.g. a mobile terminal in uplink, or a radio base station in downlink) in respect of signals received over a plurality of frequency-aggregated carriers (component carriers) between the transmitting and receiving nodes. If all signals are decoded correctly in the receiving node, a positive acknowledgement message (ACK) is sent to the transmitting node; if not all signals are decoded correctly, a negative acknowledgement message (NACK) is sent, or no acknowledgement message is sent.

In this way, a single acknowledgement message can be sent for signals received over multiple carriers. The acknowledgement message can have the same format as legacy standards (for example, as specified in Release 8 of the 3GPP specifications), providing compatibility with existing equipment. The number of messages is also reduced compared with the straightforward approach of transmitting individual acknowledgement messages per component carrier.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
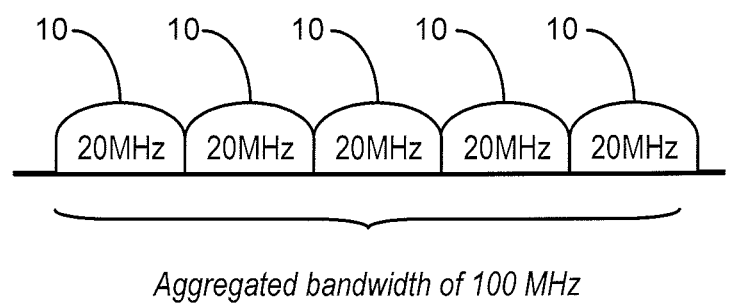
FIG. 1 shows an example of aggregated component carriers.
Figure 2:
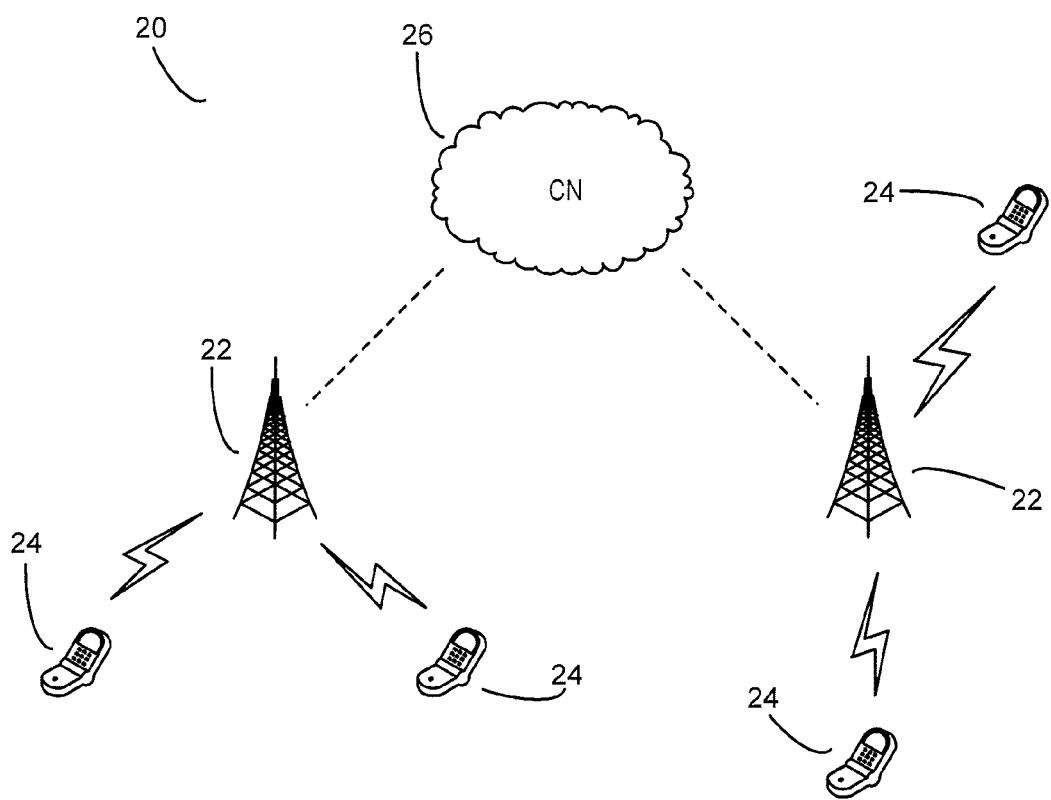
FIG. 2 shows part of a telecommunications network according to the present invention.

FIG. 2 shows part of a telecommunications network 20 according to the present invention.

The network 20 comprises a plurality of radio base stations 22, each of which communicates with a plurality of mobile terminals 24 in so-called "cells". Each radio base station 22 further communicates with a core network 26. For example, where the network 20 is an evolved UMTS terrestrial radio access network (E-UTRAN), the core network 26 comprises an evolved packet core, itself comprising a mobility management entity (MME), a serving gateway and a PDN (packet data network) gateway.

Those skilled in the art will appreciate that the radio base stations 22 may also be known as NodeBs, or evolved NodeBs (eNodeBs). Similarly, the mobile terminals 24 may also be known as user equipment (UEs).

Communications between the radio base stations 22 and the mobile terminals 24 take place over a plurality of carriers aggregated together in the frequency domain (also known as component carriers). Such component carriers may exist in downlink communications (from the radio base station 22 to the mobile terminal 24), and/or in uplink communications (from the mobile terminal 24 to the radio base station 22).

Figure 3:
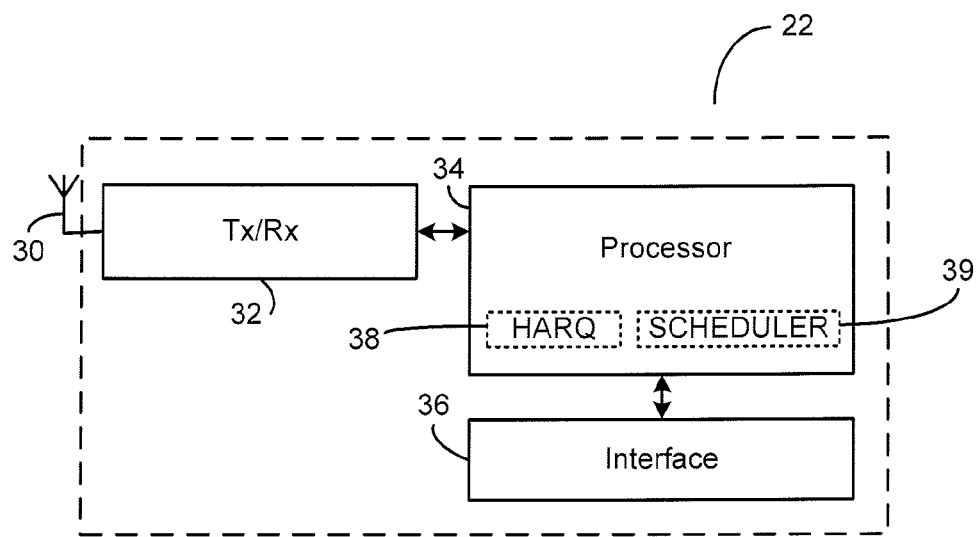
FIG. 3 shows a radio base station according to the present invention.

FIG. 3 shows a radio base station 22 according to the present invention.

The base station 22 comprises an antenna 30, coupled to transmitting and receiving circuitry 32. The Tx/Rx circuitry 32 is further coupled to processing circuitry 34. The processing circuitry comprises a HARQ block 38 and a scheduler 39, as will be described in greater detail below. The radio base station 22 further comprises interface circuitry 36, coupled to the processing circuitry 34, for interfacing with the core network 26.

It will be apparent to those skilled in the art that, where they are non-essential to describe the present invention, numerous features have been omitted for clarity. Further, it will also be apparent that the base station 22 may comprise more than one antenna, and more than one Tx/Rx circuitry, in order to transmit and receive multiple-input, multiple-output (MIMO) communications. All such variations are within the scope of the present invention as defined by the claims appended hereto.

In use, the antenna 30 operates to receive signals from mobile terminals 24 over a plurality of component carriers. The Tx/Rx circuitry 32 demodulates the signals and passes them to processing circuitry 34, which determines if the signals were correctly decoded. The HARQ block 38 generates a HARQ response (ACK, NACK or no acknowledgement) according to whether the signals were correctly decoded or not. The Tx/Rx circuitry 34 modulates the HARQ response and the antenna 30 transmits the HARQ response to the mobile terminal 24. The nature of the HARQ process will be described in greater detail below.

The antenna 30 is also operable to receive scheduling requests from mobile terminals 24. Such scheduling requests are sent by mobile terminals 24 in the uplink to request resources on shared channels, such that the mobile terminals 24 may then transmit data over those shared channels. Thus, the antenna 30 receives a scheduling request from a mobile terminal 24, the Tx/Rx circuitry 32 demodulates the signal, and the scheduler 39 determines which (or whether) resources are to be allocated to the mobile terminal 24 in the uplink. The scheduler 39 generates a scheduling grant message, which is modulated by the Tx/Rx circuitry 32, and transmitted to the mobile terminal 24 by the antenna 30. The radio base station 22 then knows which resources (i.e. on which carriers) it is expecting to receive communications from the mobile terminal 24.

The radio base station 22 is also operable to transmit resource allocation messages to the mobile terminal 24 indicating the component carriers on which the mobile terminal 24 is scheduled to receive data in the downlink. In one embodiment, one resource allocation message is transmitted over each scheduled component carrier. Thus, the scheduler 39 generates such resource allocation messages, Tx/Rx circuitry 32 modulates them, and the antenna 30 transmits them to the mobile terminal 24. The radio base station 22 then transmits data over the scheduled component carriers to the mobile terminal 24.

Figure 4:
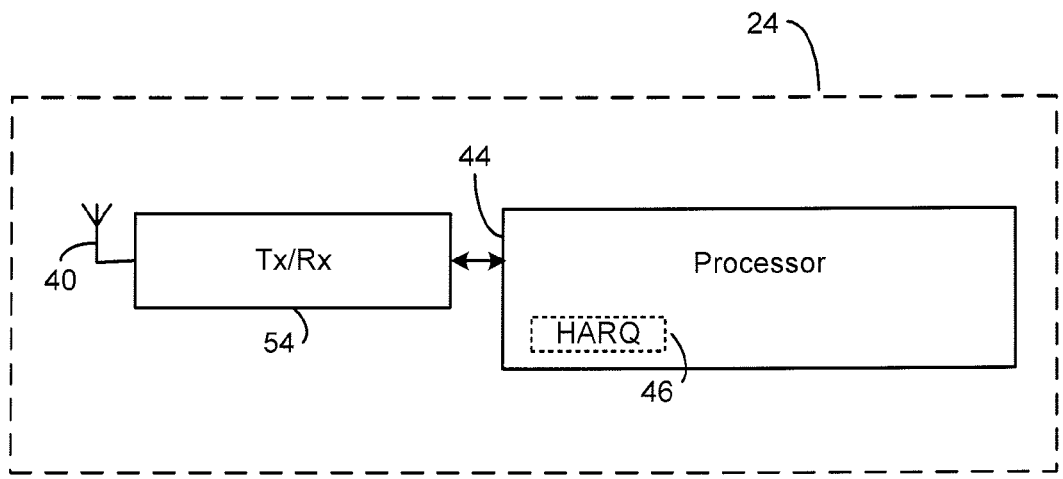
FIG. 4 shows a mobile terminal according to the present invention.

FIG. 4 shows a mobile terminal, or user equipment, 24 according to the present invention.

The mobile terminal 24 comprises an antenna 40, coupled to transmitting and receiving circuitry (Tx/Rx) 42. The Tx/Rx circuitry 42 is further coupled to processing circuitry 44. The processing circuitry 44 comprises at least a HARQ block 46.

It will be apparent to those skilled in the art that, where they are non-essential to describe the present invention, numerous features have been omitted for clarity. Further, it will also be apparent that the mobile terminal 24 may comprise more than one antenna, and more than one Tx/Rx circuitry, in order to support MIMO communications. All such variations are within the scope of the present invention as defined by the claims appended hereto.

In use, the antenna 40 operates to receive signals from a radio base station 22 over a plurality of component carriers. The Tx/Rx circuitry 42 demodulates the signals and passes them to processing circuitry 44, which determines if the signals were correctly decoded. The HARQ block 46 generates a HARQ response (ACK, NACK or no acknowledgement) according to whether the signals were correctly decoded or not. The Tx/Rx circuitry 42 modulates the HARQ response and the antenna 40 transmits the HARQ response to the radio base station 22. The nature of the HARQ process will be described in greater detail below.

The antenna 40 and Tx/Rx circuitry 42 also operate to receive and demodulate resource allocation messages and scheduling grants transmitted by the radio base station 22, as described above.

The antenna 40 and Tx/Rx circuitry 42 further operate to transmit scheduling requests to the radio base station 22, in order to be granted resources (via scheduling grants) to transmit data over a shared channel, as described above.

According to the present invention, a receiving node of a telecommunications network (e.g. a radio base station in uplink, or a mobile terminal in downlink) transmits a single acknowledgement message to a transmitting node (e.g. a mobile terminal in uplink, or a radio base station in downlink) in respect of signals received over a plurality of frequency-aggregated carriers (component carriers) between the transmitting and receiving nodes. If all signals are decoded correctly in the receiving node, a positive acknowledgement message (ACK) is sent to the transmitting node; if not all signals are decoded correctly, a negative acknowledgement message (NACK) is sent, or no acknowledgement message is sent.

In this way, a single acknowledgement message can be sent for signals received over multiple carriers. The acknowledgement message can have the same format as legacy standards (for example, as specified in Release 8 of the 3GPP specifications), providing compatibility with existing equipment. The number of messages is also reduced compared with the straightforward approach of transmitting individual acknowledgement messages per component carrier.

Figure 5:
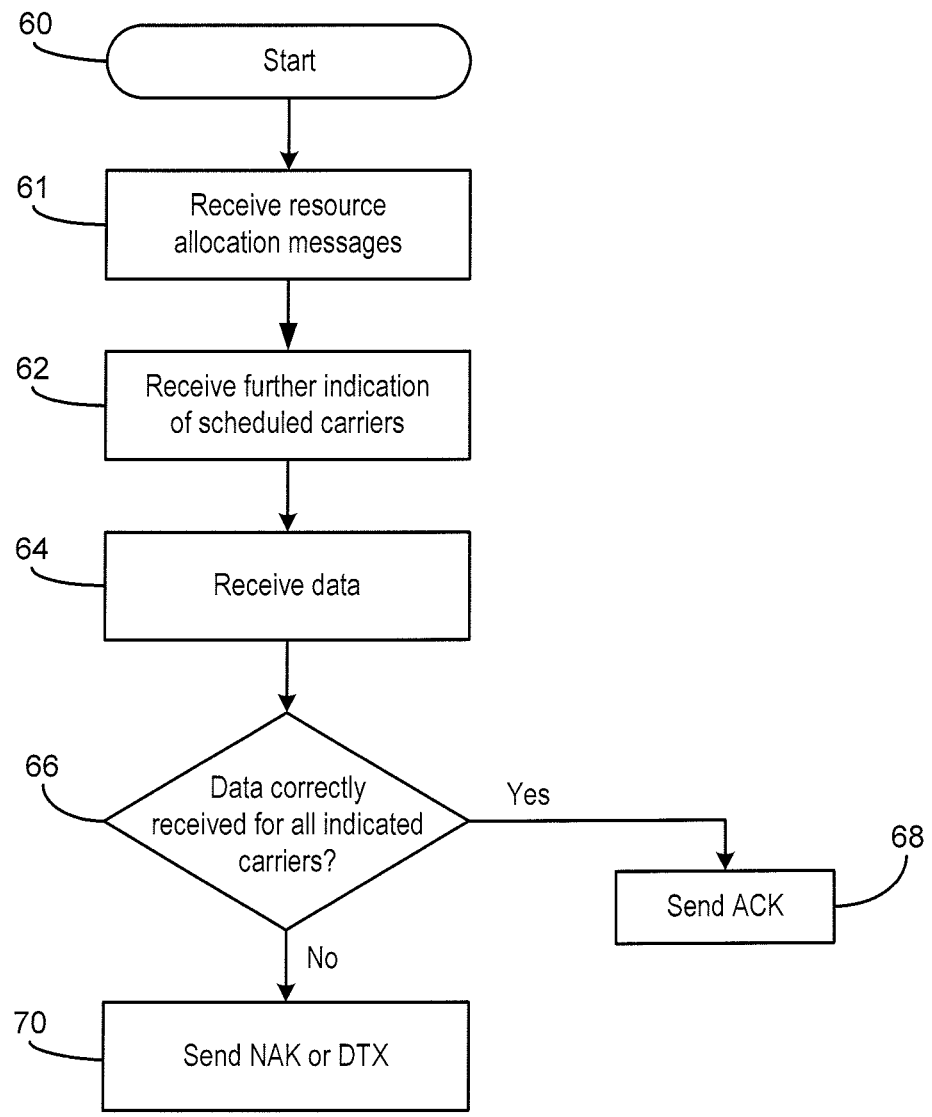
FIG. 5 shows a method according to the present invention.

FIG. 5 is a flowchart of a method in a receiving node according to the present invention, whereby a transmitting node transmits data over a plurality of frequency-aggregated carriers.

The method starts in step 60.

In step 61, the receiving node receives one or more resource allocation messages indicating the carriers on which data is scheduled to be transmitted from the transmitting node to the receiving node. In one embodiment, a resource allocation message is transmitted over each carrier that is scheduled. That is, if data is scheduled to be transmitted over carriers #1, #3, and #5, for example, a resource allocation message is transmitted on each of carriers #1, #3 and #5. The receiving node then knows to "listen" for data transmitted over the scheduled carriers (i.e. carriers #1, #3 and #5 in this example).

Step 61 is optional in that, for uplink communications, no resource allocation messages are sent from the mobile terminal to the radio base station (i.e. step 61 does not exist in uplink communications). Rather, requests for uplink scheduling are transmitted from the mobile terminal, which may then be granted by the receiving radio base station. In downlink communications, resource allocation messages are transmitted from the radio base station to the mobile terminal as described above with respect to step 61.

In step 62, the receiving node receives further scheduling information of the carriers on which data is scheduled to be transmitted.

In downlink communications, the scheduling information is transmitted from the radio base station 22 to the mobile node 24 as described in greater detail below.

In one embodiment, such scheduling information simply comprises the number of carriers that are scheduled (e.g. if eight carriers are defined for transmissions, and carriers #1, #3 and #5 are scheduled, the indication is of three carriers). The receiving node then knows how many carriers it should be receiving signals on.

In another embodiment, the scheduling information includes an indication of which carriers are scheduled for transmissions. For example, such an indication may be a list of carrier indices, or may be a bitmap pointing to the scheduled carriers.

The scheduling information may be coded in a number of different ways.

In one embodiment, the scheduling information may be transmitted with the resource allocation messages transmitted in step 61. Thus, each resource allocation message may additionally comprise an indication of the total number of scheduled carriers, or the identities of the scheduled carriers etc, as described above.

In another embodiment, the scheduling information is coded in-band, together with the data transmitted on each carrier. The information is not required before then, as until the receiving node has successfully decrypted a transmission over at least one carrier, a NACK message, or no acknowledgement message at all, will be sent, resulting in a retransmission of the signals. In another embodiment, the scheduling information is provided by way of signalling on L1/L2 control channels for one or more of the scheduled carriers. The scheduling information may be provided on the L1/L2 control channels of one, or a subset, or each of the scheduled carriers. In another embodiment, the scheduling information may be provided by way of scrambling (or cyclic redundancy code scrambling, CRC) of the data transmitted on at least one of the scheduled carriers, or providing multiple identities for the receiving node, one for each number (or set) of carriers on which the receiving node is scheduled to receive data.

The scheduling information may be provided on one of the scheduled carriers (which reduces the resource overhead in sending the scheduling information), or on all of them, which provides the maximum probability that the scheduling information will be successfully received by the receiving node (i.e. because it only requires a single carrier to be successfully decoded to obtain all of the scheduling information). However, in an embodiment, the scheduling information is spread between a subset of the scheduled carriers, i.e. a compromise may be reached between the above two extremes. This embodiment saves transmission resources, but also decreases the probability that scheduling information will be entirely missed, compared with the case where scheduling information is sent over a single scheduled carrier.

In uplink communications, the radio base station 22 grants the mobile terminal 24 resources on which to transmit the uplink data. Therefore the receiving node in this embodiment (i.e. the radio base station) already has knowledge of the carriers on which data is scheduled to be transmitted.

In step 64, the receiving node receives, or attempts to receive, data over the scheduled carriers. From the above discussion of step 62, it will be clear to those skilled in the art that in some embodiments this step may occur substantially simultaneously with step 62. That is, the scheduling information may be included in-band with the data transmitted over the scheduled carriers.

In step 66, with its knowledge of at least the number of scheduled carriers (and possibly also the identity of the scheduled carriers) the receiving node determines whether the data was correctly received over all scheduled carriers.

If the data was correctly received over all scheduled carriers, the method proceeds to step 68, and a positive acknowledgement (ACK) message is transmitted to the transmitting node. If the data was not correctly received over one or more of the scheduled carriers, the method proceeds to step 70, where a negative acknowledgement message (NACK) is transmitted to the transmitting node, or no acknowledgement message is transmitted at all. An advantage of this latter embodiment is that the transmitting node may detect the lack of an acknowledgement (known as discontinuous transmission, or DTX) and then choose not to increase the redundancy version of a future retransmission, reducing the number of retransmissions required if some redundancy versions are not self-decodable.

That is, as mentioned above, in some embodiments the receiving node may make use of soft combining to increase the chances of successfully decoding a retransmission of a previously failed transmission. In general, transmitted information is coded, resulting in a set of coded bits representing the information. The number of coded bits is larger than the number of information bits, and hence redundancy is added. A subset of the coded bits is transmitted and then received in step 64. The larger the number of coded bits (for a fixed number of information bits), the more robust the transmission and the lower the probability of error (lower code rate). The term "redundancy version" denotes which subset of coded bits (all representing the same set of information bits) is transmitted. In different circumstances, it may be beneficial to retransmit information using a different redundancy version, or to retransmit information using the same redundancy version. For example, if the first transmission is not received at all, it may be beneficial to retransmit without increasing the redundancy version as described below.

As an example, assume a block of information bits is coded and four subsets of coded bits are created, A, B, C, D (the subsets may be partially overlapping). The subset A is transmitted but the receiver fails to decode the data. Hence, in one embodiment a retransmission takes place, where B is transmitted. The receiving node then uses the (undecodable) set A together with the retransmitted set B and tries to decode the information. If unsuccessful, set C is transmitted, and the process continues in this manner. Thus, for each retransmission, the redundancy version is increased.

Now, if set A was not received at all, it can turn out to be better to retransmit A instead of using B (for some codes, e.g. Turbo codes used in Release 8 of the 3GPP specifications, some of the coded bits are more important than others in the decoding process and "self-decodable" is sometimes used to refer to a set including the "more important" bits). This corresponds to not increasing the redundancy version. Hence, in this embodiment it may be possible to decode the data after two transmission attempts, (A (missed) and A), while if the redundancy version was increased, three transmission attempts may be needed (A (missed), B, C).

Receiving further scheduling information as described in step 62 allows the receiving node to overcome the following potential error. If, in step 61, the receiving node fails to receive one or more resource allocation messages, it will not know to listen for data that is later transmitted on the carriers corresponding to those failed resource allocation messages. If data is otherwise decoded successfully on the scheduled carriers for which resource allocation messages were successfully received, a positive acknowledgement message will be transmitted even though data was not successfully decoded on the carriers where the resource allocation message failed. Thus, if the receiving node knows at least how many carriers it is scheduled to receive data on, it can transmit a NACK message (or send no acknowledgement) if data is not successfully decoded on all carriers.

As described above, acknowledgement messages according to the present invention apply to all scheduled carriers (i.e. a single ACK/NACK is sent in respect of all scheduled carriers). However, it will be apparent to those skilled in the art that more than one acknowledgement message may be sent, each relating to a subset (i.e. two or more) of the scheduled carriers. For example, where four carriers are scheduled for transmissions, two processes may run simultaneously, each in respect of two of the carriers.

Alternatively, a single message may continue to be sent in respect of all scheduled carriers, but where the acknowledgement message comprises a plurality of bits, each bit corresponding to a subset (i.e. two or more) of the scheduled carriers. For example, where four carriers are scheduled for transmissions, an acknowledgement message may comprise two bits, each in respect of two carriers.

These latter two embodiments are particularly advantageous when the scheduling information includes an indication of the carriers which are scheduled. The receiving node then knows which of the carriers the failed transmission occurred on, and can acknowledge that failure appropriately.

According to embodiments of the present invention, a smaller number of hybrid-ARQ acknowledgement messages are sent than the number of component carriers used for transmission. For example, in one embodiment a single acknowledgement message could relate to all component carriers; only if all component carriers were decoded correctly will an ACK be sent.

The present invention therefore provides a method and apparatus for acknowledging transmissions between a transmitting node and a receiving node over a plurality of frequency-aggregated carriers. The method reduces the number of acknowledgement messages compared with the number of scheduled carriers, and thereby reduces the overhead for the acknowledgement process (e.g. HARQ).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a receiving node of a telecommunications network, said receiving node being configured to receive data from a sending node of the telecommunications network over frequency-aggregated component carriers, said method comprising:
    receiving information indicating a number of frequency-aggregated component carriers in a first plurality of frequency-aggregated component carriers over which data is being sent, or is to be sent, to the receiving node;
    determining whether data is successfully received over all of said first plurality of component carriers based on the received information;
    if data is successfully received over all of the first plurality of said component carriers, sending a single first positive acknowledgement message in respect of said first plurality of component carriers to said sending node; and
    if data is not successfully received for one or more of said first plurality of component carriers, sending a single negative acknowledgement message, or sending no acknowledgement message, in respect of said first plurality of component carriers.

2. A method as claimed in claim 1, wherein said information comprises the identities of the component carriers in said first plurality of component carriers.

3. A method as claimed in claim 2, wherein said information comprises a bitmap.

4. A method as claimed in claim 1, wherein said information is coded together with data received on each component carrier.

5. A method as claimed in claim 1, wherein said information is provided by way of one or more bits on respective L1/L2 control channels of one or more of said first plurality of component carriers.

6. A method as claimed in claim 5, wherein said information is provided by way of one or more bits on respective L1/L2 control channels of each of said first plurality of component carriers.

7. A method as claimed in claim 1, wherein said information is provided by way of scrambling of the data on at least one component carrier of said first plurality of component carriers.

8. A method as claimed in claim 1, wherein said information is received complete on each component carrier of said first plurality of component carriers.

9. A method as claimed in claim 1, wherein said information is spread over more than one component carrier of said first plurality of component carriers.

10. A method as claimed in claim 1, wherein the information further indicates a second plurality of frequency-aggregated component carriers over which data is being sent, or is to be sent, to the receiving node; and
   if data is successfully received over all of said second plurality of component carriers, sending a second single positive acknowledgement message in respect of said second plurality of component carriers to said sending node.

11. A method as claimed in claim 1, wherein the information further indicates a number of component carriers in a second plurality of frequency-aggregated component carriers over which data is being sent, or is to be sent, to the receiving node; and
   wherein said single first positive acknowledgement message is further sent in respect of said second plurality of component carriers, and comprises a first bit related to said first plurality of component carriers, and a second bit related to said second plurality of component carriers.

12. A network node for use in a telecommunications network, the network node being configured to receive data from a sending node of the telecommunications network over frequency-aggregated component carriers, the network node comprising:
   circuitry adapted to receive information indicating a number of frequency-aggregated component carriers in a first plurality of frequency-aggregated component carriers over which data is being sent, or is to be sent, to the network node;
   a processor configured to decode data received over the first plurality of said component carriers, and to determine whether data is successfully received over all of said first plurality of component carriers based on the received information, and, if data is successfully received over all of said first plurality of component carriers, generating a single first positive acknowledgement message in respect of said first plurality of component carriers and, if data is not successfully received for one or more of said first plurality of component carriers, generating a single negative acknowledgement message, or generating no acknowledgement message, in respect of said first plurality of component carriers.

13. A network node as claimed in claim 12, wherein the network node is a mobile terminal, and wherein the receiving means is a receiver.

14. A network node as claimed in claim 12, wherein the network node is a radio base station, and wherein the receiving means is a scheduler.

15. A network node as claimed in claim 12, wherein the processor is further configured to receive said information indicating the number of frequency-aggregated component carriers in the first plurality of frequency-aggregated component carriers being sent by the sending node separately from data being sent over the first plurality of frequency-aggregated component carriers.

16. A method as claimed in claim 1, further comprising sending said information indicating the number of frequency-aggregated component carriers in the first plurality of frequency-aggregated component carriers from the sending node to the receiving node separately from data being sent over the first plurality of frequency-aggregated component carriers.

17. A method as claimed in claim 16, further comprising:
   including said information in resource allocation messages received at the receiving node; and
   sending the resource allocation messages from the sending node to allocate frequency-aggregated component carriers in a downlink from the sending node to the receiving node.

18. A network node for use in a telecommunications network, the network node being configured to receive data from a sending node of the telecommunications network over frequency-aggregated component carriers, the network node being configured to:
   receive information indicating a number of frequency-aggregated component carriers in a first plurality of frequency-aggregated component carriers over which data is being sent, or is to be sent, from the sending node to the network node;
   determine whether the data is successfully received over all said first plurality of component carriers based on the received information;
   if data is successfully received over all of said first plurality of component carriers, generate a single first positive acknowledgement message in respect of said first plurality of component carriers; and
   if data is not successfully received for one or more of said first plurality of component carriers, generate a single negative acknowledgement message, or generate no acknowledgement message, in respect of said first plurality of component carriers.

* * * * *